(12) United States Patent
Zerl et al.

(10) Patent No.: US 8,351,028 B2
(45) Date of Patent: Jan. 8, 2013

(54) MEASURING DEVICE FOR MEASURING A FOCUSED LASER BEAM

(75) Inventors: Bernd Zerl, Herzogenaurach (DE); Olaf Kittelmann, Berlin (DE)

(73) Assignee: Wavelight GmbH, Erlangen (DE)

( * ) Notice: Subject to any disclaimer, the term of this patent is extended or adjusted under 35 U.S.C. 154(b) by 129 days.

(21) Appl. No.: 12/677,776

(22) PCT Filed: Sep. 12, 2008

(86) PCT No.: PCT/EP2008/007575
§ 371 (c)(1),
(2), (4) Date: Jun. 8, 2010

(87) PCT Pub. No.: WO2009/036932
PCT Pub. Date: Mar. 26, 2009

(65) Prior Publication Data
US 2010/0253937 A1 Oct. 7, 2010

(30) Foreign Application Priority Data
Sep. 13, 2007 (EP) .................................. 07017968

(51) Int. Cl.
*G01J 1/00* (2006.01)
(52) U.S. Cl. ........................................ 356/122; 326/121
(58) Field of Classification Search .......... 356/121–123, 356/225–226; 250/201.1–201.4; 42/122, 42/119; 359/811–815, 822–826, 818–819, 359/808–809, 827, 704
See application file for complete search history.

(56) References Cited

U.S. PATENT DOCUMENTS

| 4,917,489 | A | 4/1990 | Nishio et al. | |
|---|---|---|---|---|
| 5,194,993 | A | 3/1993 | Bedzyk | |
| 7,463,342 | B2 * | 12/2008 | Kim et al. | 356/29 |
| 2004/0066504 | A1 | 4/2004 | Farnsworth | |

(Continued)

FOREIGN PATENT DOCUMENTS

| JP | 2022658 (Y2) | 6/1990 |
|---|---|---|
| JP | 7001201 (B) | 1/1995 |
| JP | 2000234916 (A) | 8/2000 |

OTHER PUBLICATIONS

"Tube Mounting System C," Catalogue Linos, Jan. 1, 2003, pp. 1-2.

(Continued)

*Primary Examiner* — Tri T Ton
(74) *Attorney, Agent, or Firm* — Haynes and Boone, LLP

(57) ABSTRACT

According to an embodiment, a measuring device for measuring a laser beam comprises a magnification lens system with a total of two lenses which are arranged in series in the beam path of the laser beam and whose foci are coinciding, as well as a camera which is arranged behind the two lenses in the focus of the last lens and includes an electronic image sensor which generates an electronic image of the magnified laser beam. The lenses together with the camera are adjustable along the beam path relative to a reference point of the measuring device, for the purpose of locating the beam waist of the laser beam and of determining a diameter profile of the laser beam. The measuring device further comprises an adapter enclosing the beam path for coupling the measuring device to a laser system which provides the laser beam. The adapter forms an abutment surface or the laser system, which is axially directed with respect to a beam axis of the laser beam, and permits the measuring device to be coupled in situ at the installation site of the laser system.

20 Claims, 4 Drawing Sheets

U.S. PATENT DOCUMENTS

2006/0043258 A1 3/2006 Jyumonji et al.
2006/0056060 A1 3/2006 Ozaki et al.
2006/0254115 A1 11/2006 Thomas et al.
2007/0019100 A1 1/2007 Mitani et al.

OTHER PUBLICATIONS

Japanese Patent Office, Office Action for the Japanese Patent Application No. JP2010-524407, dated Jun. 19, 2012, 6 pages.

* cited by examiner

MEASURING DEVICE FOR MEASURING A FOCUSED LASER BEAM

CROSS-REFERENCE TO RELATED APPLICATION

This application is a United States national phase application of co-pending international patent application number PCT/EP2008/007575, filed Sep. 12, 2008, which claims the benefit of EP Application No. 07 017 968.4 filed Sep. 13, 2007, the disclosure of which is incorporated herein by reference.

BACKGROUND

The invention relates to a measuring device for measuring a focused laser beam. The laser beam to be measured is employed, in particular, in the ophtalmic laser surgery, such as in a photorefractive treatment of the cornea or the lens. Of course, this is merely an example; principally, the invention is not subject to any limitations with respect to the application purpose of the laser beam to be measured. A precise knowledge of certain beam parameters is generally necessary for many laser applications, with only two out of numerous other examples besides the laser surgery of the eye, the photolithography in the semi-conductor technology as well as the laser scanning or laser writing of optical data carriers being mentioned herein.

Beam parameters of interest of a laser beam often include the beam diameter, in particular in the area of the beam waist, as well as the beam divergence, but other parameters, too, such as the diffraction index (usually expressed as $M^2$) or the intensity profile transverse to the beam direction.

For the measurement of a laser beam so-called knife edge or slit methods are known, in which a blade or a sufficiently narrow slit is moved transversely through the beam and transmitted power is measured depending on the blade or slit position, respectively, by means of a detector. By the differentiation of the transmission curve which has been obtained in this manner, the intensity profile may subsequently be determined, by means of which in turn the beam diameter may be determined.

As an alternative to the above transmission measuring methods which are based on "scanning" of the beam, it is known, e.g. from U.S. Pat. No. 4,917,489, to magnify the laser beam by means of a single magnification lens and to direct the magnified laser beam following a suitable intensity attenuation to an image pickup device (image sensor). It is then possible to calculate the beam diameter at the object-side lens focus under consideration of the magnification factor of the lens from the generated image of the laser beam.

In contrast, an inventive measuring device for the measurement of a focused laser beam comprises a magnification lens system with at least two lenses disposed in series in the beam path of the laser beam, wherein each pair of successive lenses of the magnification lens system has coinciding focal points, an electronic image sensor disposed behind the magnification lens system at a focal point thereof, for capturing an image of the magnified laser beam, an adapter which encloses the beam path, for coupling the measuring device to a laser system which provides the laser beam, with the adapter forming an abutment surface for the laser system, which abutment surface is axially directed with respect to a beam axis of the laser beam, as well as longitudinal adjustment means which permit a simultaneous adjustment of the lenses of the magnification lens system and the image sensor along the beam path with respect to a reference point of the measuring device provided on the adapter.

SUMMARY

Preferred embodiments of the inventive measuring device are indicated in the dependent claims.

In the reference literature on the optics of Gaussian beams (see also e.g. Kühlke, Dietrich: "Optik, Grundlagen and Anwendungen", Harri Deutsch Verlag, 1st edition, 1998), a dependency of the magnification factor of a single magnification lens of the beam diameter of the laser beam to be measured is taught. When taking the quotient of the waist diameter of the magnified beam and the waist diameter of the non-magnified beam as the magnification factor, it follows in particular that the magnification factor of a single magnification lens for smaller waist diameters may be significantly higher than that for larger waist diameters. The assumption of a nominal, constant magnification scale may thus lead to significant measurement errors when using a single magnification lens for the measurement of foci with different waist diameters.

The inventors realised that a multiple lens system is able to eliminate the dependency of the magnification scale from the beam diameter, if each pair of successive lenses has coinciding foci. In this case, an invariably constant magnification scale may be assumed, regardless of how large the waist diameter is of the beam to be measured. This permits a much more precise determination of the actual waist diameter of the laser beam to be measured.

The longitudinal adjustment means of the inventive measuring device permit a defined adjustment of the lenses and the image sensor as a whole along the beam path relative to a reference point which belongs to the measuring device. Belonging to the measuring device means that the reference point is located at or within the measuring device and is thus stationary relative to the measuring device as a whole. The adjustability of the ensemble consisting of the lenses and the image sensor along the beam path enables to precisely locate the beam waist of the laser beam to be measured and consequently the precise adjustment of the measuring device, so that the focus of the laser beam coincides with the focus of the first lens of the magnification lens system. This situation will be present when the beam cross-section which is captured by the image sensor has its smallest value. With the inventive mutual arrangement of the lenses and the image sensor, the beam waist will be imaged on the sensor surface of the image sensor when it is located in the focus of the first lens. This position may easily be found by a longitudinal adjustment of the ensemble consisting of the lenses and the image sensor relative to the beam focus.

The longitudinal adjustability of the lenses and the image sensor is alternatively or additionally useful for the determination of the beam diameter at various positions along the laser beam, in other words, for the determination of a diameter profile of the laser beam. Such a diameter profile allows to gain information e.g. with respect to the divergence of the beam and the diffraction index. Needless to say that a suitably programmed electronic evaluation unit will be provided for the determination of these and other beam parameters, which evaluates and interprets the electric image signals which have been supplied by the image sensor and buffered in a storage, if required.

The adjustable range which is provided by the longitudinal adjustment means for the system consisting of the lenses and the image sensor preferably extends across at least three times the Rayleigh length of the laser beam.

If desired, the longitudinal adjustment means may additionally provide for a longitudinal adjustment of the lenses relative to each other or/and relative to the image sensor, e.g. for calibration purposes or for the compensation of component and assembly tolerances.

According to an embodiment which provides for a particularly short design of the measuring device, the magnification lens system comprises a total of two lenses. For an adequate magnification scale, a relatively small focal length of the first lens is required, so that the first lens will have to be made relatively small. Larger lenses which can be handled and installed more conveniently are possible if the magnification lens system comprises a total of four lenses. The magnification power may then be divided into tow stages—consisting of one pair of lenses each—so that with the same total magnification the magnification of each pair of lenses may be smaller than that of the single pair of lenses in the embodiment with a total of two lenses.

All lenses of the magnification lens system may be designed as convergent lenses each. Alternatively, it is possible that the magnification lens system comprises at least one divergent lens, with at least the last lens being designed as a convergent lens. Due to its negative focal length, the use of a divergent lens permits a shortening of the structural space compared to a convergent lens. This may be utilised in particular with embodiments comprising more than two lenses, where a greater focal length of the first lens may be chosen so that the benefit in structural space due to the use of a divergent lens is greater than with solutions having a total of two lenses, where the first lens has a comparatively short focal length. In each case, the last lens is to be designed as a convergent lens, because the image sensor requires a real image of the laser beam.

In order to keep the wave front deformation by the magnification lens system small it was found to be of advantage when at least one lens of the magnification lens system has one planar lens face and has its curved lens face directed toward the beam portion having smaller divergence. The magnification lens system therefore preferably includes merely plano-convex or plano-concave lenses, but no lenses which are curved on both sides, although this is of course not mandatory.

Component and assembly tolerances may cause that at least some of the optical components of the measuring device are not exactly oriented with respect to the laser beam in the direction transverse to the beam path. The measuring device therefore preferably comprises transverse adjustment means which permit an adjustment at least of the first lens of the magnification lens system transversely, in particular, vertically, to the beam path relative to the above mentioned reference point of the measuring device. It was found that a misalignment of the first lens of the magnification lens system transverse to the beam path may have a particularly strong impact on the location of the image position on the image sensor, the wave front deformations, and the image distortions, but in any case stronger than corresponding misalignments of the other lenses. For this reason, at least the first lens should be transversely adjustable. According to a variant, it alone may be transversely adjustable, i.e. independent of the other lenses and independent of the image sensor. According to another variant, the first lens together with at least a further lens of the magnification lens system, in particular together with all lenses of the magnification lens system and preferably also together with the image sensor may be transversely adjustable as a unit.

The transverse adjustment means suitably permit an independent adjustment of at least the first lens of the magnification lens system in two mutually orthogonal transverse directions.

A preferred configuration of the measuring device provides for at least some of the lenses, in particular all lenses of the magnification lens system in the beam path, to be installed in series in a lens barrel which is adjustable by means of the longitudinal adjustment means in the direction of the barrel axis relative to the reference point. The lens barrel may preferably be displaceably guided in the axial direction, but secured against rotation, in a guide receiving opening of a guide body which is designed in particular tubular, with the longitudinal adjustment means being effective between the lens barrel and the guide body.

One end of the lens barrel may axially protrude from the guide body and is adapted in the region of its protruding end for mechanical coupling to a camera accommodating the image sensor.

For the compensation of any play between the lens barrel and the guide body it is recommended that elastic bias means are effective between the lens barrel and the guide body, which axially bias the lens barrel relative to the guide body.

In a preferred embodiment of the measuring device the guide body carries the adapter. The adapter is preferably a component which is separate from the guide body and is replaceably connected to the guide body. This permits a modular construction of the measuring device for which a plurality of selectively usable, different adapters for coupling to different laser systems may then be made available.

The discussed transverse adjustment means may be effective between the adapter and the guide body.

The adapter suitably forms an abutment surface for the laser system, which is axially directed with respect to a beam axis of the laser beam. This abutment surface may then serve as a reference point for the longitudinal and, if required, for the transverse adjustment of the optical components of the measuring device.

BRIEF DESCRIPTION OF THE DRAWINGS

The invention will be explained in more detail in the following with reference to the accompanying drawings in which.

DETAILED DESCRIPTION

Figure 1:
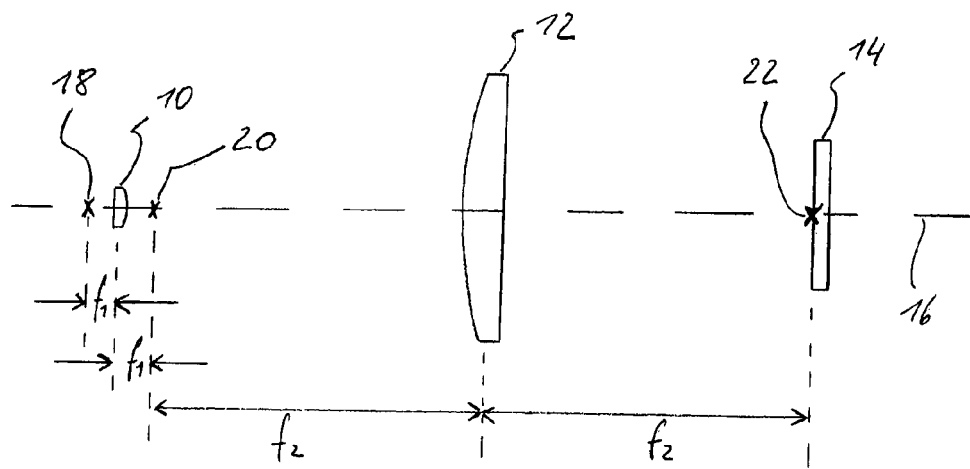
FIG. 1 is a schematic illustration of the relative arrangement of a pair of lenses and an image sensor for capturing an enlarged image of a laser beam.
Figure 2:
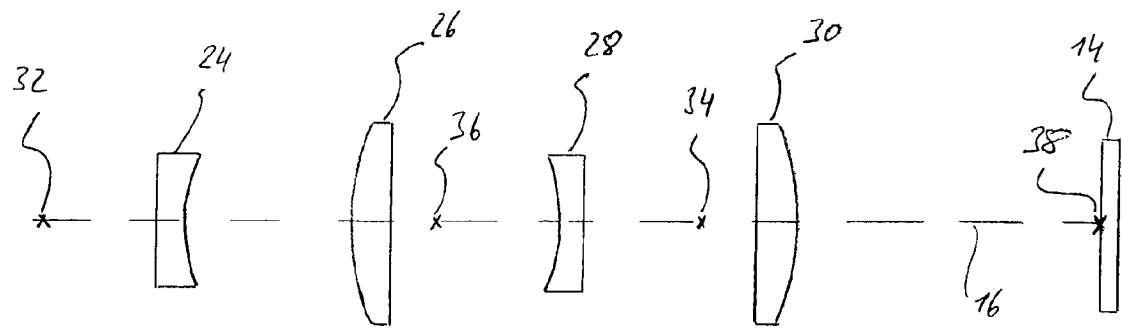
FIG. 2 is a schematic illustration of the relative arrangement of two pairs of lenses and an image sensor for capturing an enlarged image of a laser beam.

FIGS. 1 and 2 show two different exemplary configurations of a magnification lens system to be used in an inventive measuring device. In the variant of FIG. 1 the magnification lens system comprises a total to two optically thin lenses 10, 12 both of which are adapted as plano-convex convergent lenses. The laser beam to be measured is initially incident on the lens 10 and subsequently on the lens 12, before its magnified image is captured by an electronic image sensor 14. The image sensor may, for example, be a CCD or a CMOS image sensor. The optical axis of the magnification lens system is indicated at 16. In order to prevent optical imaging errors it is desirable that the beam axis of the laser beams coincides with the optical axis 16. Due to the fact that a misalignment of the optical components of the measuring devices transversely to the beam direction of the laser beam caused by component or assembly tolerances can often not be avoided completely, suitable transverse adjustment means are provided in preferred embodiments of the inventive measuring device, by means of which the lenses of the magnification lens system and the image sensor as well, if required, can be adjusted transversely to the beam direction in such a manner that the optical axis 16 coincides essentially exactly with the beam axis.

The lens 10 of FIG. 1 has a focal length $f_1$; its two foci (object side and image side) are identified by 18 and 20, respectively.

The lens 12 has a focal length $f_2$. It is arranged in such a manner that its object side focus coincides with the image side focus 20 of the first lens 10. The lens 12 has a focus 22 on the image side. The sensor plane of the image sensor 14 coincides with said focus 22.

If with this mutual arrangement of the lenses 10, 12 and of the image sensor 14, the beam waist of the laser beam to be measured lies in the focus 18, it is imaged on the image sensor 14 at a magnification scale which is independent of the waist diameter. The image sensor 14 is connected with electronic evaluation means (not shown in detail) which receive the image signals of the sensor 14, convert them into a digital form, if required, and determine the magnified as well as the actual (non-magnified) waist diameter therefrom. For an attenuation of the intensity of the laser beam one or several neutral density filters (grey filters) may be arranged in its beam path. In the exemplary configuration of FIG. 1, in particular, such a grey filter may be provided between the lens 12 and the image sensor 14. The optical thickness of the grey filter will then lead to a minor displacement of the focus 22, which has to be taken into account when positioning the image sensor 14.

It can be seen that the curved sides of the lenses 10, 12 are facing the beam portion having smaller divergence. The magnification of the waist diameter, which is effected by the first lens 10, is accompanied by a parallelisation of the beam, which causes a smaller divergence of the laser beam at the image side of the lens 10 than at the object side. That which applies for the lens 12 is, however, that the laser beam has a higher divergence at its image side. This results in the arrangement of the lenses shown in FIG. 1, with their curved sides facing each other. The measure to have the planar lens sides face the beam portions of higher divergence and to have the curved lens sides face the beam portions of smaller divergence enables to keep the wave front deformations caused by the lenses 10, 12 small and to thereby reduce the image distortions to a minimum.

If, in a numerical example, the magnification scale is assumed to be approx. 20 (i.e. the waist diameter at the image sensor 14 is to be 20 times larger than the non-magnified waist diameter), then a focal length of e.g. approx. 3 mm for the lens 10 and a focal length of approx. 60 mm for the lens 12 may be selected. These focal lengths enable to achieve a comparatively overall short size of the measuring device. The above numerical specifications are, of course, merely exemplary; in particular other values for the magnification scale may be worth striving for, which may require other focal lengths of the lenses 10, 12.

In the variant of FIG. 2 the magnification lens system comprises a total of four—again optically thin—lenses which are now identified by 24, 26, 28, 30. The image sensor is still identified by 14 and the optical axis by 16. The second lens 26, when viewed in the direction of the beam propagation, and the fourth lens 30 each are designed as plano-convex convergent lenses, while the first lens 24 and the third lens 28 each are designed as plano-concave divergent lenses. The pair of lenses 24, 26 forms a first magnification stage of the magnification lens system, while the second pair of lenses 28, 30 forms a second magnification stage. The magnification factors of the two magnification stages may be identical or different; the overall magnification scale results from the product of the magnification factors of the two magnification stages.

In the illustrated exemplary case, the two convergent lenses 26, 30 have the same focal length; the two foci of the convergent lens 26 are identified by 32, 34, those of the convergent lens 30 by 36, 38. Due to their negative focal length, the divergent lenses 24, 28 each are arranged behind the focus of the following convergent lens, but again in such a manner that their (virtual) foci coincide with the focus of the respective successive convergent lens. This means that the focus 32 is at the same time a (virtual) focus of the lens 24 and the foci 34, 36 also correspond to one (virtual) focus each of the divergent lens 28.

The use of divergent lenses in lieu of convergent lenses permits a shortening of the size of the measuring device, with this effect being more pronounced with the four-lens configuration of FIG. 2 than with the two-lens configuration of FIG. 1.

To present another numerical example: If the magnification scale of the magnification lens system is again assumed to be approx. 20, then the convergent lenses 26, 30 each may have a focal length of approx. e.g. 42 mm, while a focal length of approx. −9 mm each may be selected for the divergent lenses. Again, these are, of course, merely exemplary specifications which may be changed at any time, in particular if another magnification scale of the magnification lens system is desired.

Figure 3:
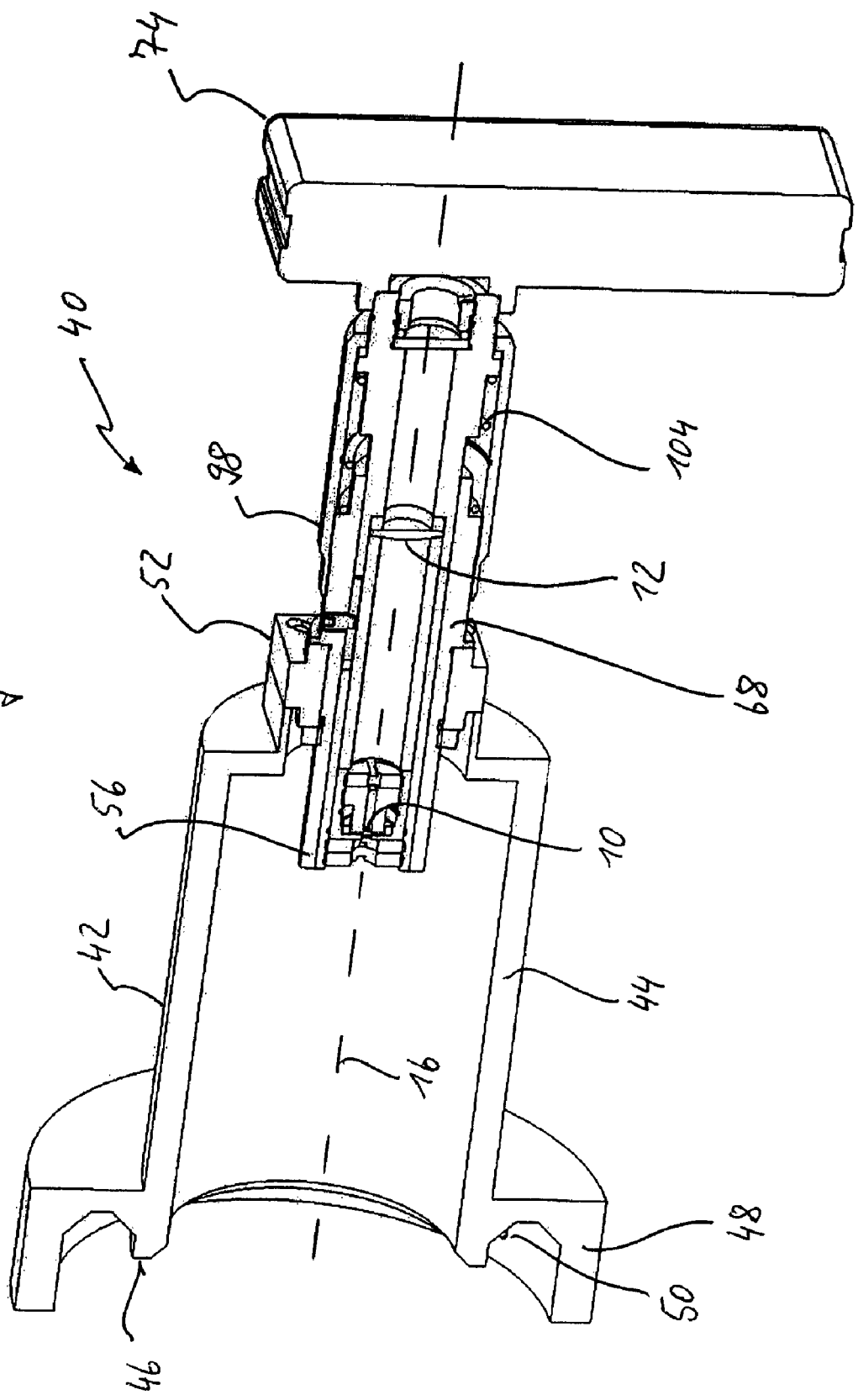
FIG. 3 is a longitudinal cross-section through an embodiment of an inventive measuring device.
Figure 4:
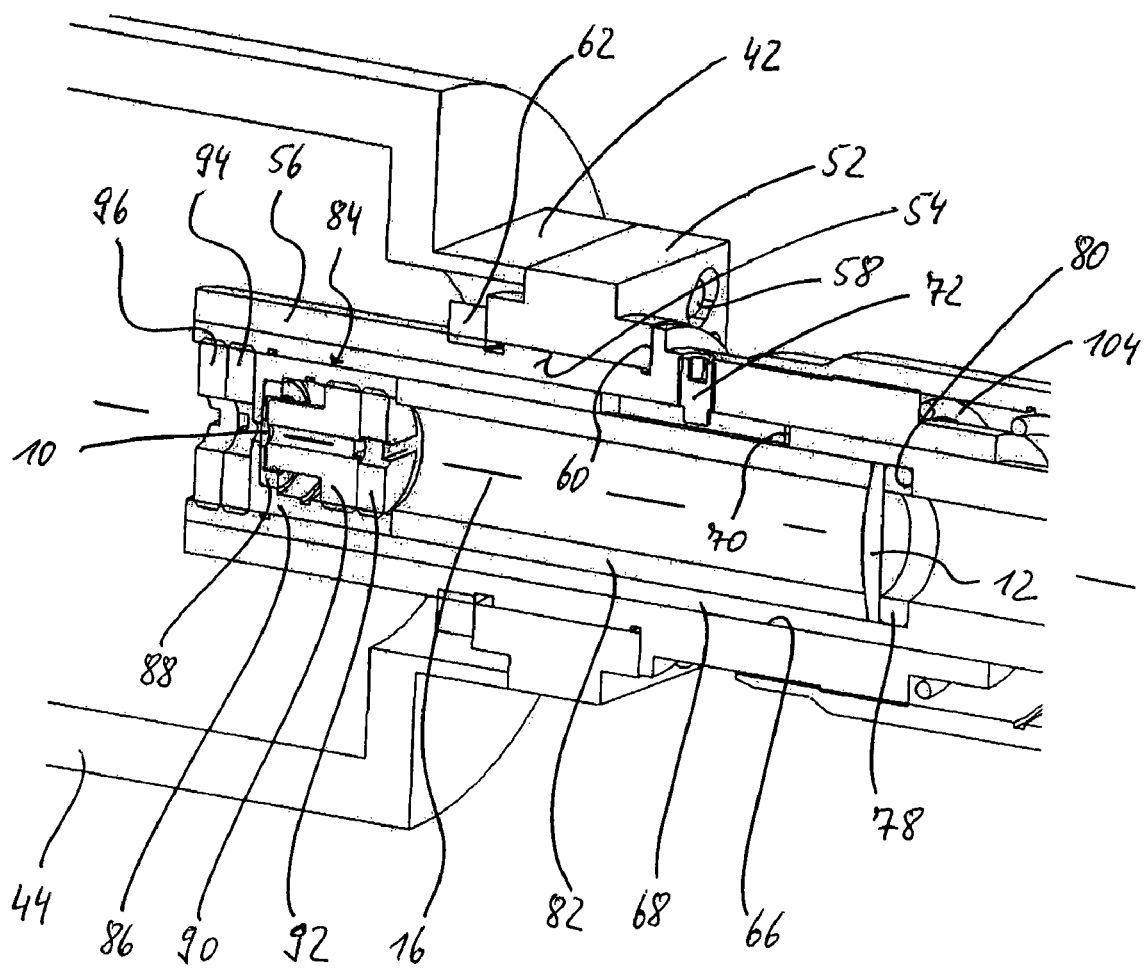
FIG. 4 shows an enlarged section of the measuring device of FIG. 3.
Figure 5:
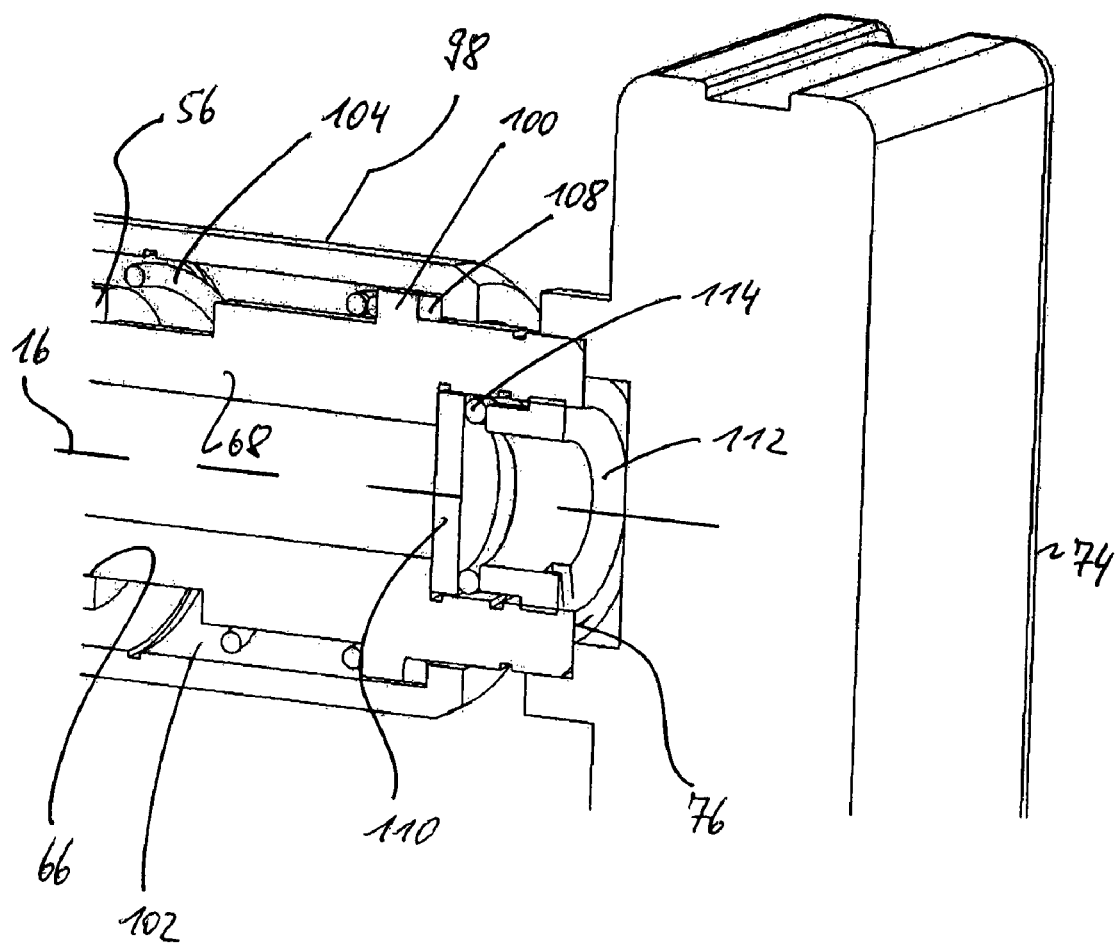
FIG. 5 another enlarged section of the measuring device of FIG. 3.

For an explanation of a concrete construction example, reference is now made to FIGS. 3 to 5. The measuring device illustrated therein is generally identified by 40. It is a hand-portable device which may be coupled to existing laser systems, without the necessity of transporting the laser system to a separate measuring site. Thus, the measuring device 40 permits an in situ measurement immediately at the installation site of the laser system.

The measuring device 40 is provided with an adapter 42 with a sleeve-like adapter main portion 44 which encloses the optical axis 16. In the region of the left-hand axial end in FIG. 3, the adapter 42 is formed for coupling to a laser system which provides the laser beam. The coupling means provided for this purpose comprise an axially directed annular abutment surface 46 which serves for an axial abutment and thus for the axial positioning of the measuring device 40 relative to the laser system. The mentioned coupling means further comprise an annular clamping portion 48, which is preferably integrally formed with the adapter main portion 44, for the radial clamping of an edge of an objective or another portion of the laser system. The clamping portion 48 is provided with a plurality of threaded holes 50 which are distributed in the circumferential direction for the insertion of radial clamping screws (not shown).

In the region of its other axial end, the adapter main portion 44 is removably connected with an adjustment block 52 which forms a receiving opening 54 for a tubular guide body 56. The adjustment block 52 is provided with threaded holes 58 for the insertion of fastening screws which are not shown in detail, by means of which the adapter 42 may be secured to the adjustment block 52. The guide body 56 is held axially stationary in the receiving opening 54 of the adjustment block 52, may, however, be adjusted relative to the adjustment block in a radial plane by means of adjustment screws (not shown in detail) of the adjustment block 52. For this purpose, the adjustment block 52 may comprise an inner sleeve which clamps the guide body 56 radially in a manner not shown in detail, and is held in a housing of the adjustment block 52 in a transversely adjustable manner. Suitable adjustment blocks are commercially available. For example, reference is made to an adjustment device with the product name "XY-Justieraufnahmeplatte OH40" available from OWIS GmbH, which may be used as the adjustment block 52, if required, slightly modified. The adjustment block 52 permits an independent transverse adjustment of the guide body 56 in two mutually orthogonal radial directions. Thus, the guide body 56 may be adjusted in a plane normal to the axis in any direction.

A fixed axial location of the guide body 56 with respect to the adjustment block 52 in the illustrated embodiment is ensured by an axial shoulder 60 at the outer circumference of the guide body 56 as well as by a screw-on ring 62 which is screwed on the guide body 56. The adjustment block 52 is held axially between the axial shoulder 60 and the screw-on ring 62.

The guide body 56 forms an axial guide receiving opening 66 for a lens barrel 68 which together with the lenses of a magnification lens system may be preassembled as a construction unit and as such a preassembled construction unit inserted into the guide body 56. In the present exemplary case, the magnification lens system corresponds to the variant of FIG. 1, so that the only two existing lenses of the measuring device in FIGS. 3 to 5 are also identified by 10 and 12. It is understood, however, that another lens configuration, such as the one of FIG. 2, may equally be installed into the lens barrel 68.

The lens barrel 68 is guided axially movably but secured against rotation in the guide receiving opening 66 of the guide body 56. For the anti-rotation of the two bodies against one another, the lens barrel 68 comprises an axial, elongated recess 70 which is formed into its outer peripheral surface, into which an anti-rotation screw (not shown in detail) engages which may be inserted into a corresponding threaded hole 72 of the guide body 56.

It can be seen that the lens barrel 68 and the guide body 56 together extend into the sleeve-shaped main portion 44 of the adapter 42, in particular to the same depth, and that the lens barrel 68 in the area of its other axial end protrudes from the guide body 56. In the region of the protruding end, the lens barrel 68 is coupled to a digital camera 74 wherein an image sensor (not shown in detail in FIGS. 3 to 5) is installed, such as the image sensor 14 of FIGS. 1 and 2. An axial abutment surface 76 at the free axial end of the lens barrel 68 permits a defined axial positioning of the camera 74 relative to the lens barrel 68 and consequently relative to the lenses 10, 12 which are installed therein. The coupling of the camera 74 with the lens barrel 68 may, e.g., be a screw coupling or a radial clamping coupling. The configuration of the measuring device 40 with a camera 74 which is removably coupled to the lens barrel 68 makes it possible to revert to commercial camera models.

It has already been mentioned that the lens barrel 68 together with the components inserted therein may be preassembled to a construction unit. Besides the two lenses 10, 12, these components comprise a front ring 78 which is pushed into the lens barrel 68 as the first component in the preassembly and provides a flat contact surface for the planar side of the lens 12. The front ring 78 contacts an axial shoulder 80 which is formed at the transition between a portion with a larger diameter of the inner body opening and a portion with a smaller diameter. Following the lens 12, a spacer tube 82 is pushed into the lens barrel 68. The spacer tube 82 is followed by a lens assembly 84 including the lens 10, which again is a preassembled construction unit. The lens assembly 84 comprises an approximately cup-shaped lens mount 86 which comprises a central through hole for the laser beam in its bottom. The lens 10 is located above this hole and with its planar lens side bears against the cup bottom of the lens mount 86. A centering disk 88 provides for the radial centering of the lens 10 in the lens mount 86. The lens mount 86 has a thread at the inside of its cup wall, into which a lens clamping screw 90 as well as a threaded disk 92 are inserted. In order to not hurt the lens 10, the lens clamping screw 90 is not tightened against the lens 10, but locked by means of the threaded disk 92.

The lens assembly 84 which has been preassembled in this manner is pushed into the lens barrel 68, until the lens mount 86 abuts the spacer tube 82. In the area of the adapter side end, the lens barrel 68 is provided with a female thread into which two further threaded disks 94, 96 can be engaged which serve to secure the remaining components in the lens barrel 68. The two threaded disks 94, 96 are again preferably locked against one another in order to prevent the transmission of axial clamping forces via the lens mount 86 and the spacer body 82 to the lens 12.

It has already been explained earlier that the lens barrel 68 is guided axially movable relative to the guide body 56 in the guide receiving opening 66. Longitudinal adjustment means are effective between the lens barrel 68 and the guide body 56, which enable a defined longitudinal adjustment of the lens barrel 68 relative to the guide body 56. These longitudinal adjustment means comprise an adjusting member 98 which is in threaded engagement with the guide body 56 and simultaneously in an axial supporting engagement with the lens barrel 68. In the illustrated exemplary case, the adjusting member is a threaded sleeve which is seated on the guide body 56 and radially extends behind a supporting collar 100 formed in the area of the camera-near end of the lens barrel 68. The threaded sleeve 98 is provided with a female thread by means of which it is screwed onto a complementary male thread of the guide body 56. An annular space 102 is formed between the threaded sleeve 98 and the lens barrel 68, in which a bias spring 104 adapted as a helical pressure spring is received. The bias spring 104 bears with one end axially against the supporting collar 100 of the lens barrel 68 and with the other end axially against the guide body 56 and exerts a bias force which urges the two bodies 56, 68 apart. This axial bias force is directed from the lens barrel 68 via its supporting collar 100 to an annular web 106 which is formed at the camera-near end of the threaded sleeve 98 and protrudes radially inwards. In order to reduce the friction between the guide body 68 and the threaded sleeve 98, a sliding ring 108 made of a material with advantageous sliding properties is put onto the lens barrel 68 between the supporting collar 100 and the annular web 106. The bias spring 104 is sufficiently strong to prevent any unintentional play-induced movement between the lens barrel 68 and the guide body 56 under normal handling conditions of the measuring device 40.

The threaded sleeve 98 enables a defined longitudinal adjustment of the system including the lenses 10, 12 and the camera 74 relative to the guide body 56 and thus relative abutment surface 46 of the adapter 42, which serves as a reference point. Due to the comparatively large thread diameter (large when compared, for example, with a micrometer screw), a very sensitive longitudinal adjustment of the lens barrel 68 may be obtained. In this manner, an adjustment accuracy of only a few micrometers can be achieved in the axial direction. Under the assumption of a diameter of approx. 34 mm of the threaded sleeve 98, such a high and precise adjustment accuracy can be achieved with a thread pitch of approx. 0.5 mm (under the additional assumption that a human hand is capable of minimally rotating the threaded sleeve 98 by 0.5 to 1 mm). The maximum adjustment travel of the lens barrel 68 in the axial direction may, for example, is in the range of a few millimeters, which is sufficient for carrying out $M^2$ measurements with the usual beam diameters, which require a longitudinal adjustability of the lens barrel 68 by three time the Rayleigh length.

For the attenuation of the intensity of the laser beam, a grey filter 110 is additionally installed in the lens barrel 68, which is pushed from the camera-near end of the lens barrel 68 into it and secured therein by means of a clamping sleeve 112, with an elastomer ring 114 sandwiched in between. In this manner, the grey filter 110 may be exchanged so that grey filters with different densities may be used for different beam intensities.

The invention claimed is:

1. A measuring device for measuring a focussed laser beam, comprising:
   a magnification lens system including at least two lenses disposed one after another along a beam path of the laser beam, wherein each pair of successive lenses of the magnification lens system has coinciding focal points;
   an electronic image sensor disposed behind the magnification lens system at a focal point thereof, for capturing a magnified image of the laser beam;
   an adapter, which encloses the beam path, for coupling the measuring device to a laser apparatus providing the laser beam, the adapter forming an abutment surface for the laser system; and
   longitudinal adjustment means permitting a simultaneous adjustment of the lenses of the magnification lens system and the image sensor along the beam path with respect to a reference point of the measuring device provided on the adapter such that the lenses of the magnification lens system and the image sensor are simultaneously moved with respect to the reference point.

2. The measuring device of claim 1, wherein at least part of said at least two lenses of the magnification lens system are mounted in a lens barrel one after another in the direction of the beam path, that the lens barrel is guided in a guide receiving opening of a guide body for movement in the direction of an axis of the barrel and is secured against rotation therein, and that the adapter is connected to the guide body.

3. The measuring device of claim 2, wherein the adapter is a separate member from the guide body and is exchangeably connected to the guide body.

4. The measuring device of claim 3 wherein the longitudinal adjustment means is disposed between the lens barrel and the guide body.

5. The measuring device of claim 2, further including a transverse adjustment means disposed between the adapter and the guide body permitting adjustment of at least a first lens of the magnification lens system with respect to the reference point in a direction perpendicular to the beam path.

6. The measuring device of claim 1, wherein the adapter includes a sleeve-like main portion enclosing the beam path, wherein the main portion is provided at one of its axial ends with coupling means for coupling to the laser system.

7. The measuring device of claim 6, wherein the coupling means is adapted for radially clamping a formation of the laser system.

8. The measuring device of claim 6, wherein the main portion of the adapter is connected at its other axial end to an adjustment block permitting adjustment of at least a first lens of the magnification lens system transverse to the beam path with respect to the adapter.

9. The measuring device of claim 1, wherein the magnification lens system includes a total of two or a total of four lenses.

10. The measuring device of claim 1, wherein all lenses of the magnification lens system are configured as a converging lens each.

11. The measuring device of claim 1, wherein the magnification lens system includes at least one diverging lens and that at least a last of the lenses is configured as a converging lens.

12. The measuring device of claim 1, wherein at least one lens of the magnification lens system has one planar lens face and has its curved lens face directed toward a beam portion having smaller divergence.

13. The measuring device of claim 1, wherein the longitudinal adjustment means permits adjustment of the magnification lens system and the image sensor by at least three-times the Rayleigh length of the laser beam.

14. The measuring device of claim 2, wherein the guide body is tube-shaped.

15. The measuring device of claim 2, wherein the lens barrel protrudes at one of its axial ends from the guide body and is adapted in the region of its protruding end for mechanical coupling to a camera accommodating the image sensor.

16. The measuring device of claim 2, further including an elastic bias means disposed between the lens barrel and the guide body for biasing the lens barrel axially with respect to the guide body.

17. A measuring device for measuring a focussed laser beam, comprising:
   a magnification lens system including at least two lenses disposed one after another along a beam path of the laser beam, wherein each pair of successive lenses of the magnification lens system has coinciding focal points;
   an electronic image sensor disposed behind the magnification lens system at a focal point thereof, for capturing a magnified image of the laser beam;
   an adapter, which encloses the beam path, for coupling the measuring device to a laser apparatus providing the laser beam, the adapter forming an abutment surface for the laser system, which abutment surface is axially directed with respect to a beam axis of the laser beam; and
   longitudinal adjustment means permitting a simultaneous adjustment of the lenses of the magnification lens system and the image sensor along the beam path with respect to a reference point of the measuring device provided on the adapter;
   wherein the image sensor is part of a camera which is replaceably coupled to the measuring device.

18. The measuring device of claim 1, wherein the measuring device is configured to be portable by hand.

19. A device for measuring a laser beam, comprising:
   an elongated guide body having a longitudinal axis;
   a lens barrel positioned within the guide body; the lens barrel being selectively axially movable along the longitudinal axis of the guide body;
   a magnification lens system disposed within the lens barrel, the magnification lens system including a first lens and a second lens, the second lens spaced from the first lens along a length of the lens barrel;

an adapter coupled to the elongated guide body, the adapter configured to couple the elongated guide body to a laser apparatus providing the laser beam;

a transverse adjustment mechanism fixedly attached to the adapter, wherein the transverse adjustment mechanism couples the elongated guide body to the adapter and permits selective positional adjustment of the elongated guide body relative to the adapter in a plane perpendicular to the longitudinal axis of the guide body; and a longitudinal adjustment mechanism coupled to the lens barrel and the guide body, the longitudinal adjustment mechanism permitting simultaneous adjustment of the first and second lenses of the magnification lens system and an image sensor along a beam path of the laser beam with respect to a reference point on the adapter such that the first and second lenses of the magnification lens system and the image sensor are simultaneously moved with respect to the reference point.

20. The device of claim 19, further comprising a filter positioned with the lens barrel, the filter configured to attenuate an intensity of the laser beam.

* * * * *